Patented Nov. 10, 1936

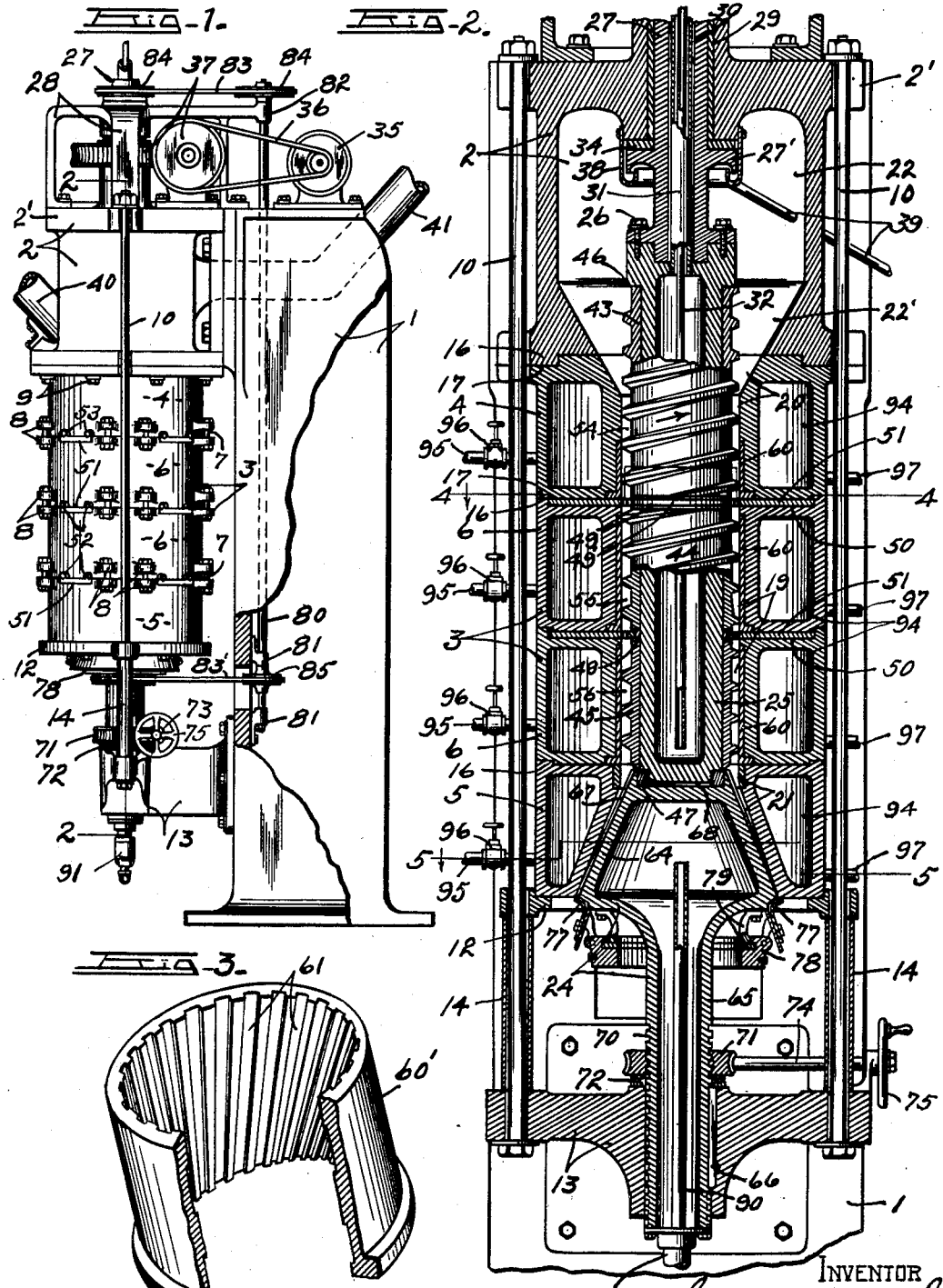

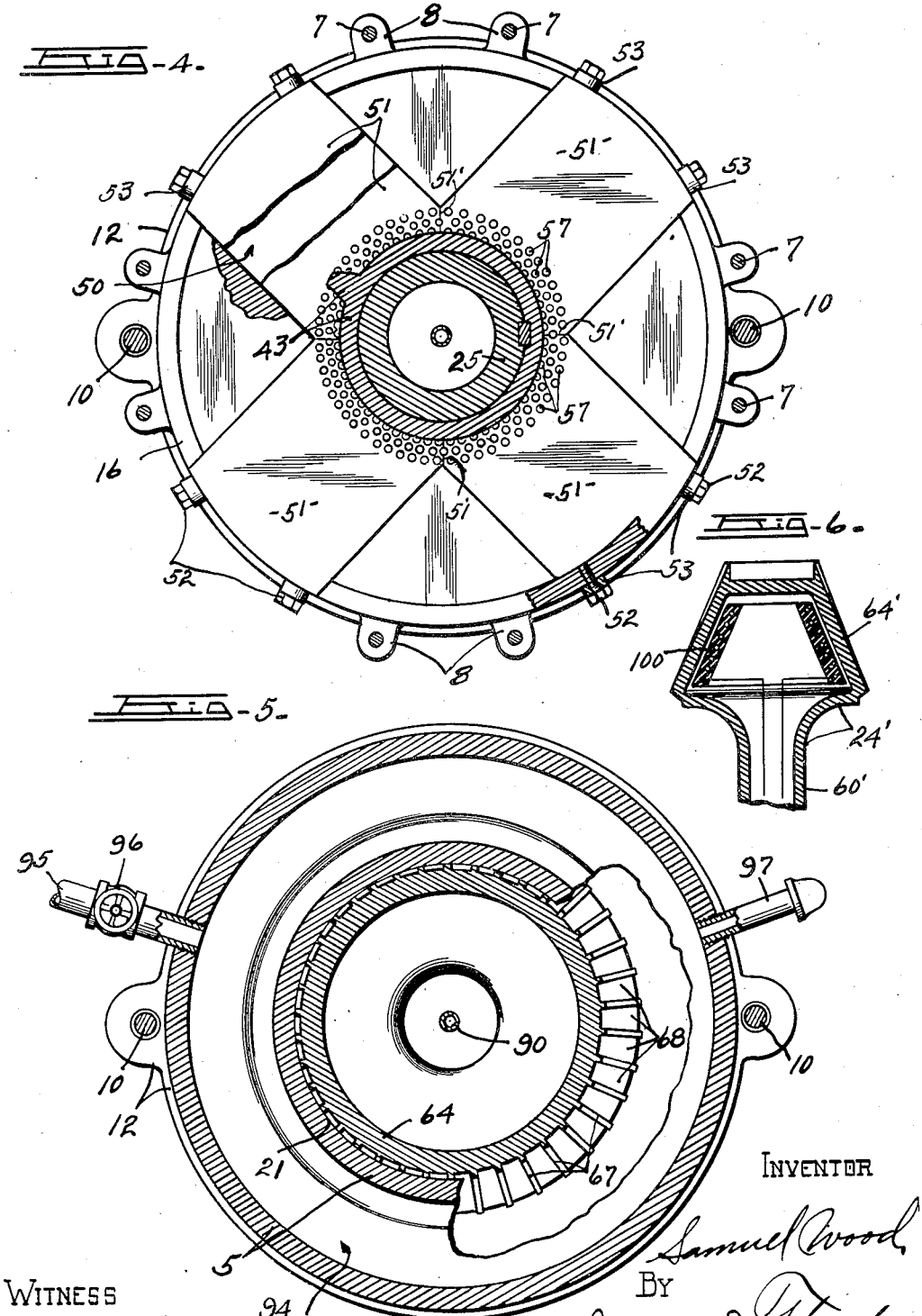

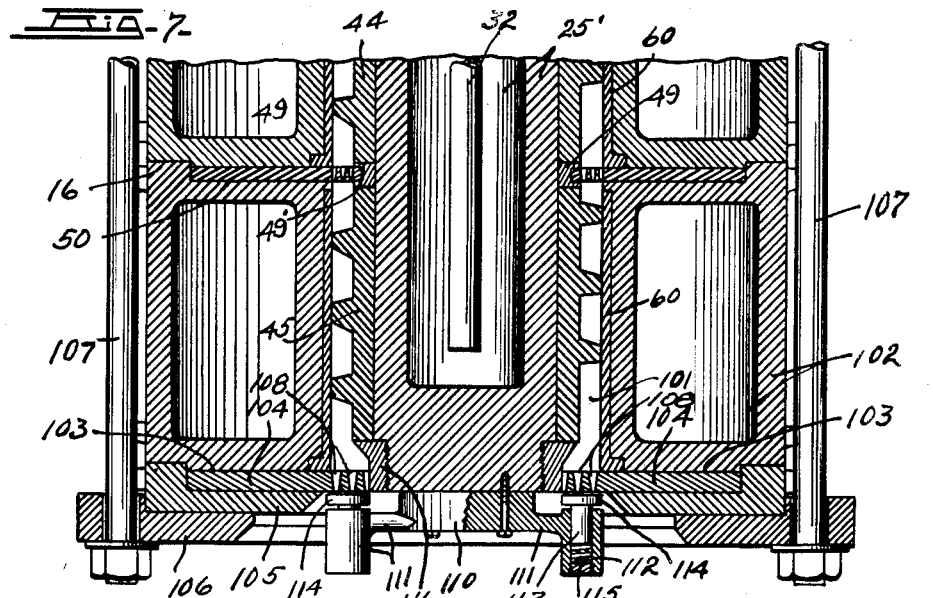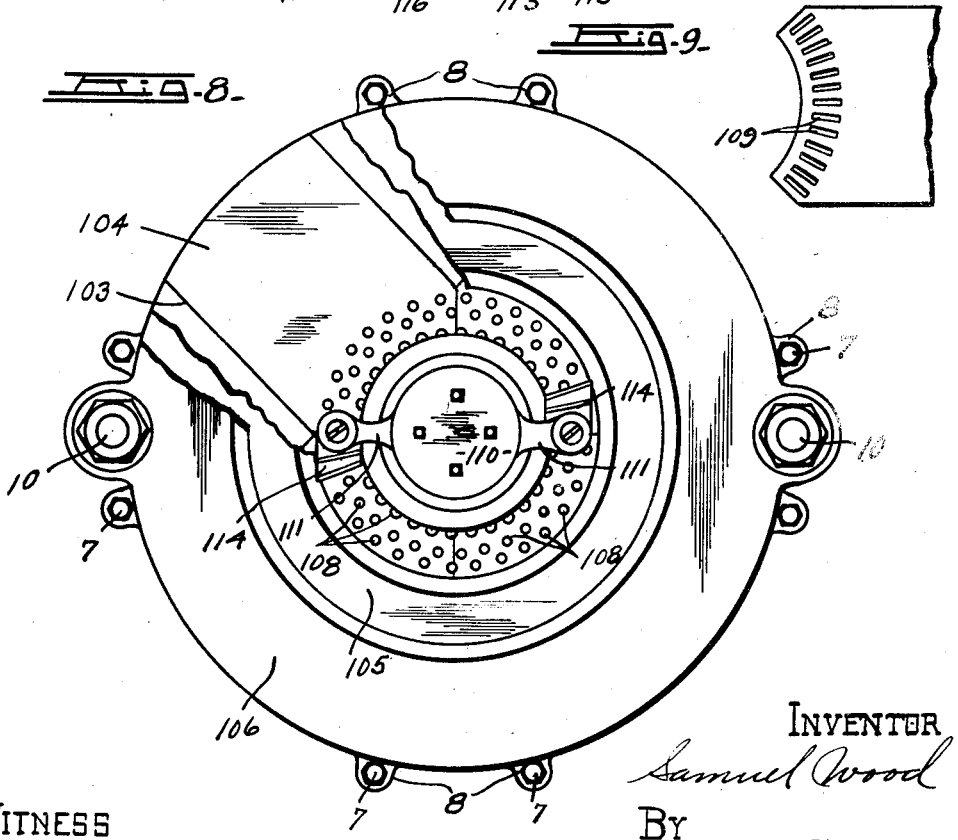

2,060,408

UNITED STATES PATENT OFFICE 2,060,408

APPARATUS FOR THE TREATMENT OF VARIOUS FLOUR PRODUCTS

Samuel Wood, Geneva, N. Y.

Application August 21, 1933, Serial No. 686,089

6 Claims. (Cl. 99—237)

This invention relates to an improved method of and apparatus for the treatment of various products in flour or grit form having a high starch content whereby the starch cells therein are disrupted and the nutritive value of the flour is thus increased.

The invention pertains more particularly to the manufacture of gelatinized starches obtained from corn, wheat, rice, tapioca or the like.

A present method for converting starches comprises passing an uncooked flour which has previously been tempered with water, in some cases as high as forty or fifty per-cent content, between pressure rolls which are heated by friction or other means to about six hundred degrees Fahrenheit. The rolls, it will be understood, must have perfectly smooth surfaces and be spaced uniformly throughout their length in order to convert the flour as it passes between them.

The primary disadvantage of this system is of a mechanical nature. The point of contact between the rolls is of a duration determined, of course, by the speed of the rolls, and in order that a complete conversion be obtained, each particle of the material must make contact with the rolls as it passes between them. Insofar as applicant is aware, this has not been possible with present systems. One reason for this is that the surfaces of the rolls become pitted after a short period of use due to the moisture of the flour coming in contact with the heated surfaces.

Another reason for this resides in the fact that the end portions of the rolls cool more readily than the middle portions which results in the rolls being of less diameter at their ends than at their central portions due to the difference in expansion. Consequently, the material which passes between the end portions of the rolls will not be processed with the same degree of efficiency as that which passes between the rolls at the center portion thereof. This not only results in a manufactured product which is not uniformly processed, but in an apparatus in which the up-keep is very high.

The main object of this invention is to produce an article of manufacture, such as gelatinized starches obtained from cereals, tapioca or the like which are more thoroughly uniformly and economically processed than heretofore.

In carrying out the above-mentioned object, I utilize both heat and pressure and regulate the same at different stages of the conversion. Further, I thoroughly mix the material being processed while subjecting the same to different stages of heat and pressure.

A further object of the invention is to provide an apparatus for accomplishing the above-mentioned results which is simple, durable and economical in construction; that may be readily adjusted for processing different grades of material and which may be quickly and easily cleaned and maintained in a wholesome sanitary condition.

Other objects and advantages pertaining to the structure of the apparatus, the form and relation of the parts thereof and to the method of operation, will more readily appear from the following description taken in connection with the accompanying drawings in which:—

Figure 1 is a side elevation, partially in section, and with portions thereof broken away, of an apparatus embodying the various features of this invention.

Figure 2 is an enlarged longitudinal vertical sectional view taken on line 2—2, Figure 1.

Figure 3 is a perspective view illustrating a modified form of a liner member for the compression cylinder, with a portion of the front wall thereof broken away.

Figure 4 is an enlarged horizontal sectional view taken on line 4—4, Figure 2, illustrating the die plates in elevation.

Figure 5 is an enlarged horizontal sectional view taken substantially on line 5—5, Figure 2, and having a portion of the cylinder broken away to better disclose the underlying parts.

Figure 6 is a detail vertical sectional view illustrating a flaker with a modified form of heating means therein.

Figure 7 is an enlarged detail horizontal sectional view of the lower end portion of a compression cylinder, illustrating a modified form of a flaker connected therewith.

Figure 8 is an inverted plan view of the structure illustrated in Figure 7, with certain portions broken away.

Figure 9 is a detail plan view of the inner end of a modified form of a die plate.

The device, as illustrated in Figures 1, 2, 4, and 5, of the drawings, comprises an upright support 1 having secured to the upper portion of the front vertical face thereof, a reservoir or hopper 2 which extends outwardly from the support 1 and has extended downwardly from the lower end thereof a compression cylinder 3. The compression cylinder 3 is composed of a plurality of, in this instance four, sections, an upper or inlet section 4, a lower or outlet section 5 and two intermediate sections 6. These sections are releasably secured together by screws or bolts 7 passing through suitable aligned apertures provided in outwardly extending lugs 8 formed on the periphery of the sections near the adjacent ends thereof. These sections are also secured to the hopper 2 by screws 9. These sections are also secured to the hopper 2 and to each other by means of a pair of longitudinally extending tie rods 10 which have the upper ends thereof mounted in a recess provided in respective sides of an annular flange 2' formed at the upper end of the hopper 2.

The lower ends of the rods pass through suitable apertures provided in a retaining ring 12 mounted adjacent the lower end of the outlet section 5 of the compression cylinder and are secured to a bearing bracket 13 mounted on the front face of the support 1 some distance below the compression cylinder 3. The retaining ring 12 is maintained in contact with the cylinder section 5 by means of spacing sleeves 14 mounted on the lower end of the tie rods 10 between said ring and the bracket 13.

In order that the cylinder sections 4, 5, and 6 will be maintained in axial alignment with each other and with the hopper 2, the outlet section 5, the intermediate sections 6 and the hopper 2 are provided at one end with an outwardly extending annular flange 16 which is positioned in a similar annular recess 17 provided in the adjacent section. Each of the cylinder sections is provided with a centrally located longitudinally extending bore which are arranged in coaxial alignment to form a continuous passage through the compression cylinder.

The bores, as 19, in the intermediate sections 6 are of a uniform diameter throughout their length, while the bores as 20 and 21 provided in the upper and lower end sections respectively, have the outer end portions more or less tapered outwardly. The bore 20 in the upper end section is tapered outwardly to meet the inwardly tapered lower end portion 22' of the inner chamber 22 of the hopper 2 to form a continuous smooth passage for directing material, as flour, or grit from the hopper into the cylinder bore.

The lower end section 5 has the bore thereof tapered outwardly, in this instance, for a greater portion of its length to form a conical wall adapted to co-operate with a flaker 24 which will hereinafter be more fully explained. Extending downwardly through the bore of the top and intermediate sections of the compression cylinder, is a hollow shaft 25 which has the lower end thereof closed and is removably secured at its upper end by screws 26 to the lower end of a vertically disposed drive shaft 27. The drive shaft 27 extends from within the hopper chamber 22 upwardly through the upper end of the hopper and a bracket 28 secured to the upper end of the hopper 2 and support 1.

The drive shaft 27 may be journaled in a suitable bearing 29 provided in the upper end of the hopper 2 and in a similar bearing, not shown, provided in the bracket 28. The drive shaft 27 is arranged in co-axial relation with the bore in the compression cylinder 3 and has a central opening 30 extending longitudinally therethrough.

A steam inlet pipe 31 is extended through the opening 30 and has the inner end thereof screw-threaded in the upper end of the hollow shaft 25 with the interior thereof in communication with the interior of the shaft 25, while an outlet or exhaust pipe, as 32, extends inwardly through the inlet pipe 31 to within a short distance of the inner end of the shaft 25 for conducting steam and water outwardly from the interior of the shaft 25.

The supply or inlet pipe 31 and the exhaust pipe 32 may be connected in any suitable well-known manner not herein necessary to further illustrate or describe, to a source of steam supply not shown, for the purpose of maintaining the shaft 25 and the members associated therewith at a predetermined uniform degree of temperature.

The drive shaft 27, as previously stated, extends some distance into the hopper chamber 22 and is provided with an annular flange 27' which forms a support for a thrust bearing member or washer 34 mounted between said flange and the lower inner end of the head of the hopper. Any suitable means may be employed for rotating the shaft 27, and for this purpose, I have illustrated a motor 35 mounted on the upper end of the support 1 and which is connected by a belt 36 to a worm and gear drive indicated at 37 mounted upon the upper end of the hopper 2 and connected with the drive shaft 27.

A trough 38 and pipe 39, as shown in Figure 2, may be mounted in the hopper 2, as shown, to carry off any excess oil escaping from the bearing 29. The hopper chamber 22, in this instance, is a cylindrical member provided with an inlet 40 at one side thereof for the conveying of material to the interior of the chamber.

The outer end of the inlet 40 may be operably connected with a conveyor or other suitable means, not shown, for supplying material to the hopper. A vent pipe 41 is also connected with the hopper chamber 22 for permitting the escape of any steam or vapor which may collect in said chamber.

The hollow shaft 25 is of considerable less diameter than that of the bore in the compression cylinder and has mounted thereon a plurality of, in this instance three, worm or screw members 43, 44, and 45 which have a close running fit in the bore of the respective cylinder sections. These screw members 43, 44, and 45 are each splined to the shaft 25 to be rotated thereby, while the screws are maintained on the shaft against axial displacement by a shoulder 46 formed at the upper end of the shaft 25 and a nut 47 screw-threaded on the lower end of said shaft between which said screw members are positioned.

The adjacent ends of the screw members may be separated, as shown, by spacing collars 49 mounted on the shaft 25 in the plane of the junction of two respective adjacent cylinder sections. It will be noted by referring to Figure 2, that the two lower screw members 44 and 45 are of substantially the same length as the bore of the corresponding cylinder sections for feeding the material through said sections, while the upper screw section 43 is somewhat longer than the other sections and extends some distance upwardly above the upper or inlet cylinder section 4 into the hopper chamber 22 to facilitate feeding the material from the hopper chamber into the cylinder bore.

The two intermediate cylinder sections 6 each have the upper end thereof provided with a plurality of, in this instance four, radially disposed inwardly extending slots or recesses 50 arranged in uniform circumferential spaced relation. These recesses are of such a loath that each side wall thereof connects with the adjacent side wall of the adjoining recess at the bore of the cylinder section.

In each of the recesses 50 is slidably mounted a die plate 51 which is removably secured in place by screws 52 passing through suitable apertures provided in upwardly extending lugs 53 provided at the outer edge of the plates and screw-threaded in the adjacent portion of the compression cylinder. These die plates 51, as illustrated more clearly in Figures 2 and 4, extend into the bore of the compression cylinder and have the inner ends thereof concaved to conform to and fitted into an annular recess 49' formed in the periphery of the spacing collars 49. These die plates each have the sides of the inner end thereof tapered inwardly at substantially forty-five degrees as at 51' so that when the die plates are in the innermost position, these tapered portions 51' of each plate will abut against similar portions of the adjoining plate and thereby form a continuous wall for dividing the compression cylinder bore into three compression chambers 54, 55, and 56.

The inner end portions of the die plates 51 which are in registration with the compression chambers, are each provided with ports 57 extending through said plates for connecting the upper pressure chamber with the lower pressure chamber so that material may be forced through said ports by the action of the respective screws from one chamber to the other. These ports 57 may, as shown more particularly in Figure 4, be circular apertures extending transversely through the plates and may be of uniform diameter throughout their lengths, or these ports may be tapered from the upper surface thereof inwardly towards the lower surface, or the ports may be of any other suitable form or size to form a restricted passageway from one pressure chamber to the next for the material being processed.

Further, these ports 57 may vary in cross-sectional area in the plates at different compression chambers. For instance, the ports 57 in the die plates positioned in the lower intermediate cylinder section may be of smaller cross-sectional area than those in the plates in the upper cylinder section 6 so that the material passing will be forced from the respective pressure chambers under increasing pressure as the material approaches the lower or outlet end of the compression cylinder. It is thus seen that the material will be forced through the die plates from one pressure chamber to the next under very high pressure which may be readily varied, as required, for different products by the substitution of other die plates having openings of the required size. This high pressure produces excessive wear on the inner wall of the pressure cylinder sections adjacent the outlet side thereof and, therefore, I have provided a liner or shell as 60 for each cylinder section composed preferably of steel or similar material. These liners or shells 60 are removably mounted in the sections so that they may be readily replaced with new liners as they become worn. The liners may have a smooth inner surface, as shown in Figure 2, or the inner surface may be provided with longitudinally extending spiral grooves 61, as illustrated in the modified form of liner 60', as shown in Figure 3, to assist in moving the material through the compression cylinder.

It will now be obvious that the ports 57 in the die plates 51 not only control the amount of pressure given to the product in each compression chamber, but that they also act as a mixer and to break up the material mass. As the material is forced through the apertures in the die plates, it is engaged by the upper end of the thread of the next screw member which acts as a cutter by breaking up the material into small pieces and then the material is again compressed for the next stage of the conversion process.

As the material is forced from the compression chamber 56 in the lower cylinder section 6, it is brought into engagement with the hereinbefore-mentioned flaker 24 where the last stage of the conversion takes place. This flaker 24 comprises a hollow head member 64 of frusto-conical form and a pendent hollow stem 65 which extends downwardly from the lower or larger end of the head 64 through the bracket 13 in which bracket the stem has a sliding fit to permit axial adjustment of the flaker head toward and from the lower or outlet section 5 of the compression cylinder. The stem is also splined as by a key 66 to the bracket 13 to maintain the flaker against rotary movement while permitting the axial adjustment thereof.

The outer conical surface of the flaker head 64 corresponds in angle of taper substantially to that of the tapered portion of the bore or outlet surface 21 in the lower cylinder section 5 and is provided with longitudinally extending ribs 67 and grooves or channels 68 arranged in alternate relation circumferentially about the head. These channels 68 are preferably of the same cross-sectional area throughout their length and increase in width and decrease in depth as they near the lower or larger end of the flaker head so that the finished product as it is forced out between the surface of the flaker head and the surface 21 of the outlet cylinder section will be in ribbon form having a thickness depending substantially upon the depth of the channels 68 at the outer edge thereof and also the relative relation of the head and said bore or outlet surface 21.

The upper end of the flaker head is recessed as at 68 to operably receive the nut 47 therein and to be supported by said nut and the shaft 25. The flaker 24 may be adjusted relative to the surface 21 by any suitable means, and for this purpose, I have shown the stem 60 as being provided with external threads 70 which are engaged by a worm 71 screw-threaded on said stem above the bearing bracket 13.

A thrust bearing as 72 is positioned between the worm gear 71 and the bracket 13 to permit the flaker to be more readily adjusted in case a pressure is being maintained on the head 64. A worm 73 engaging the worm gear 71 is mounted upon a horizontally disposed shaft 74 which is journaled in suitable bearings provided on the bracket 13 and has secured to the other end thereof a hand wheel 75 by which said shaft and gear may be manually manipulated. Although I have shown the flaker as being maintained against rotation, it is obvious the flaker may be as readily rotated, in which case the key 66 is eliminated and the channels 68 may be extended spirally downwardly, while the flaker may be secured to the shaft 25 to be drawn thereby.

It is desirable that some means be provided for cutting or breaking up the finished product as it comes from the flaker 24, and for this purpose, I have provided one or more knives as 77 which are mounted upon an annular frame 78 rotatably mounted upon a bracket 79 secured to the under face of the head 64. The frame 78 and the knives 77 may be rotated, as illustrated more clearly in Figure 1, from the drive shaft 27 through the medium of a vertically disposed shaft 80 positioned within the support 1 and mounted in suitable bearings as 81 secured to the support adjacent the lower end of the shaft in a bearing 82 secured to or made integral with the bracket 28 adjacent the upper end of the shaft. This shaft 80 is operably connected with the drive shaft 27 by means of a belt 83 and pulleys 84, one of which is secured to the drive shaft 27 and the other to the upper end of the vertical shaft 80. This shaft 80 is also operably connected with the frame 78 by a belt 83' which travels in an annular groove provided in the frame 78 and about a pulley 85 secured to the lower end of the shaft 80.

In order that the flaker 24 may be maintained at a predetermined temperature, I have shown said flaker as being provided with a steam inlet pipe 90 which extends upwardly through the stem 60 and may be connected in any suitable manner to a steam source, not shown. An outlet or exhaust pipe as 91 may be secured, as shown, to the lower end of the stem 60 and may also be connected with the source of steam supply or to any other member to form a drain for the exhaust steam or vapor collecting in the flaker.

In order that the compression cylinder 3 may be heated, I have provided each of the cylinder sections with a heating chamber as 94 surrounding the respective compression chamber. Each of these chambers 94 is provided with an individual feed pipe 95 which may be connected with a corresponding source of steam supply or other means for heating the respective chamber. Control valves as 96 may be provided in the pipes 95 to permit the control of the heating element entering the respective heating chambers. Each of these chambers is also provided with an outlet pipe as 97 which may be connected with the source of heat supply or exhaust to atmosphere as desired.

In Figure 6, I have illustrated a flaker 24' similar to the flaker 24 illustrated in Figure 2. This flaker comprises a hollow head 64' frusto-conical in form and which has a pendent stem 60' provided with a central opening through which lead wires may be passed to an electrical heating element as 100 which may be mounted within the head 64'. The flaker head may be provided with a heating element, as illustrated in Figure 6, when it is desired to maintain said heat at a higher degree of temperature than it is possible to do by means of steam or hot water.

While I have shown the hollow shaft 25 and the compression cylinder sections 4, 5, and 6 provided with means whereby said members may be heated by steam or hot water, it is obvious that these members may be as readily heated by other means such as a suitably constructed electric heating element similar to that illustrated in Figure 6 for the flaker 24', or these members may be heated by gas or other suitable means. Furthermore, it is obvious that these members may be as readily connected with a cooling medium as a heating means for maintaining said members in a relatively cool condition when the heat generated by the friction produced during operation is greater than that required in the processing of certain products.

In Figures 7 and 8, I have illustrated a modified form of flaking apparatus. In the structure shown in these views, the bore as 101 provided in the lower or outlet cylinder section as 102 is of substantially uniform diameter throughout its length. The section 102 has the lower end thereof provided with radially disposed inwardly extending recesses 103 similar to the recesses 50 provided in the compression cylinder section 6 shown in Figures 2 and 4. Each of these recesses has removably mounted therein a die plate 104 similar to the die plates 51. These plates are maintained in operative position on the lower end of the section 102 by means of an annular plate 105 mounted on the lower end of the section 102 and an annular retaining ring 106 positioned adjacent the outer face of said plate 105 and held in operative relation with said plate by means of tie rods 107 which may have the upper ends thereof secured to the hopper 2 in the manner illustrated in Figures 1 and 2.

The inner end portions of the die plates 104 may be provided, as shown, with a plurality of annular apertures 108 extending therethrough, or these plates may have elongated or rectangular openings or apertures as 109 illustrated in Figure 9 depending upon the shape it is desired that the finished product may have. In order that the material passing through the die plates may be cut into suitable lengths, I have provided a knife-supporting bracket 110 which is secured to the lower end of the hollow shaft 25' which, in this instance, is extended downwardly through the lower compression cylinder section 102 to a position in the plane of or slightly below the die plates 105. This bracket 110 has a body portion substantially circular in outline which is provided with a pair of radially extending arms 111. The outer end of each of these arms is provided with an aperture 112 in which is mounted the stem 113 of a knife member 114. The knife is yieldingly pressed upwardly into engagement with the lower surface of the die plates 104 by spring members 115 mounted in the lower portion of the opening 112 beneath the stem 113.

It will be observed that inasmuch as the die plates 104 are maintained against rotary movement upon the cylinder section 102 that the knives 114 will be driven about the die plates 104 by the shaft 25'.

It will be observed by referring to Figure 7 that the nut as 116 which maintains the screw members 43, 44, and 45 against axial movement on the shaft 25' extends some distance above the inner edge of the die plates 104. This structure provides a continuous closed surface adjacent the upper face of the die plates so that material being forced under high pressure through the apertures in the die plates cannot be forced between relative moving parts of the die plate and feed members and thus prevent the efficient operation of the device.

It will now be observed that in the construction illustrated in Figures 7, 8, and 9 that the finished product coming from the machine may be in flake, pellet or cube form as desired, depending upon the form of the apertures provided in the die plates and that while I have illustrated two forms of apertures, it is obvious that other forms and shapes of apertures may as readily be provided as required for different materials.

In the operation of the machine illustrated in the drawings, when it is desired to make gelatinized starch, the flour, before entering the machine, is mixed with a relatively small percentage of water, say fifteen or twenty percent content after which this flour is admitted through the inlet 40 into the hopper chamber 22 after which it is fed by the upper screw member 43 into the first compression chamber 54 provided in the upper compression cylinder section 4 where it is subjected to heat and pressure treatment as it passes through said chamber and the corresponding die members into the next chamber 55 provided in the upper intermediate cylinder section 6.

As the material passes through the die plate into the chamber 55, the material is first engaged by the upper end of the thread of the screw 44 and broken or cut into chunks which are again compressed under heat treatment as it is fed downwardly along the chamber 55 to the lower end of said chamber into engagement with the second series of die plates. As the material is forced through the second series of plates, it is again broken off by the upper end of the thread of the screw 45 and then is again subjected to further pressure and heat treatment as it is fed downwardly through the lower cylinder section 6 into engagement with the flaker member 24.

It will thus be seen that the material during its passage through the compression cylinder 3 is subjected to a series of pressure and heat treatments, and at the same time, is agitated and mixed to such an extent that all of the particles of the material will receive substantially the same degree of processing treatment so that a complete conversion will be obtained.

While I have shown and described a mechanism adapted more particularly for the manufacture of gelatinized starches, it is obvious that the machine can be as readily used with but slight changes for making different products such as adhesives from such materials as casein, soy bean flour or any combination of mixtures that are processed by pressure and heat, or it is equally adapted to be used in the maunfacture of foundry corebinder made of corn mill starch produced on the wet system. When utilizing this machine in the manufacturing of such foundry corebinder, I put the raw material through the machine with a moisture content varying from twelve to twenty-two percent while the temperature of the machine is maintained at substantially 150 degrees F. In the processing of this material, I preferably use the structure shown in Figures 7 and 8 wherein the material escapes from the die plates in pellet form and is thereafter subjected to a further conversion process on a conventional flaker roll machine wherein the pressure rolls are maintained at from 400 to 600 degrees F. depending upon the diameter of the rolls and the speed of rotation thereof.

Furthermore, it will be observed that the mechanism disclosed herein is comparatively simple in construction and operation and that it is particularly adapted to be easily maintained in a clean, sanitary condition due to the ease in which the die plates may be removed from the compression cylinder 3 and replaced therein, and although I have shown and particularly described the preferred embodiment of my invention, I do not wish to be limited to the exact construction shown, as various changes in the form, relation and size of the parts thereof may readily be made, without departing from the spirit of this invention, as set forth in the appended claims.

I claim:

1. A device of the class described comprising a compression cylinder, a pressure screw within the cylinder, said screw having an annular groove thereon, die elements extending radially through the walls of said cylinder and having their inwardly projecting ends in registration with said annular groove for dividing the cylinder into pressure chambers and for separating the material mass as it passes from one of said pressure chambers to the next chamber, and means at the outlet of said cylinder for separating the material into predetermined form comprising co-acting cylindrical surfaces, at least one of said surfaces having longitudinal grooves or channels for the passage of material therethrough.

2. A device of the class described comprising a compression cylinder, a pressure screw within the cylinder, said screw having an annular groove thereon, the die elements extending radially through the walls of said cylinder and having their inwardly projecting ends in registration with said annular groove for dividing the cylinder into pressure chambers and for separating the material mass as it passes from one of said pressure chambers to the next chamber, flaker means at the outlet of said cylinder for separating the material into predetermined form comprising a surface having longitudinally extending channels for the passage of material therethrough, and means for adjusting said flaker for producing flakes of different sizes.

3. A device of the class described comprising a compression cylinder composed of cylindrical sections secured together in co-axial relation, a pressure screw within the cylinder, said screw having an annular groove opposite at least one joint between two of said cylindrical sections, die elements mounted between adjacent cylindrical sections, said die elements having their inwardly projecting ends in registration with said annular groove for dividing the cylinder into pressure chambers and for separating the material mass as it passes from one of said pressure chambers to the next chamber.

4. A device of the class described comprising a compression cylinder composed of cylindrical sections secured together in co-axial relation, a pressure screw within the cylinder, said screw having an annular groove opposite at least one joint between two of said cylindrical sections, die elements removably mounted between adjacent cylindrical sections, said die elements having their inwardly projecting ends in registration with said annular groove for dividing the cylinder into a plurality of pressure chambers arranged in axial spaced relation and separating the material mass as it passes from one of said chambers to the next chamber.

5. A device for processing plastic materials comprising a compression cylinder, said cylinder being composed of a plurality of cylindrical sections secured together in co-axial relation, a high pressure screw within the cylinder, said screw being composed of a plurality of sections, a spacing ring between the adjacent sections of said screw, at least one of said rings being positioned opposite a joint between two of said cylindrical sections and having an annular groove therein, die elements removably mounted between adjacent cylindrical sections radially disposed with respect to said screw and having their inwardly projecting ends in registration with said annular groove for dividing the cylinder into pressure chambers and for separating the material mass as it passes from one of said pressure chambers to the next chamber.

6. An apparatus for processing plastic material comprising a compression cylinder having an inlet opening and an outlet opening, forming means at the outlet opening providing restricted passages for separating the material mass into predetermined shape, pressure means within the cylinder comprising screw conveyor elements arranged in axial spaced relation with each other and die elements mounted in the cylinder and projecting between adjacent screw elements for dividing the cylinder into axially spaced pressure chambers and for separating the material mass as it passes from one of said pressure chambers to the next chamber, the threads of said screw elements being arranged to operate in close sliding contact with the walls of the pressure chambers and with the die elements for forcing the material through the die elements and forming means under high pressure.

SAMUEL WOOD.